Figure 1:
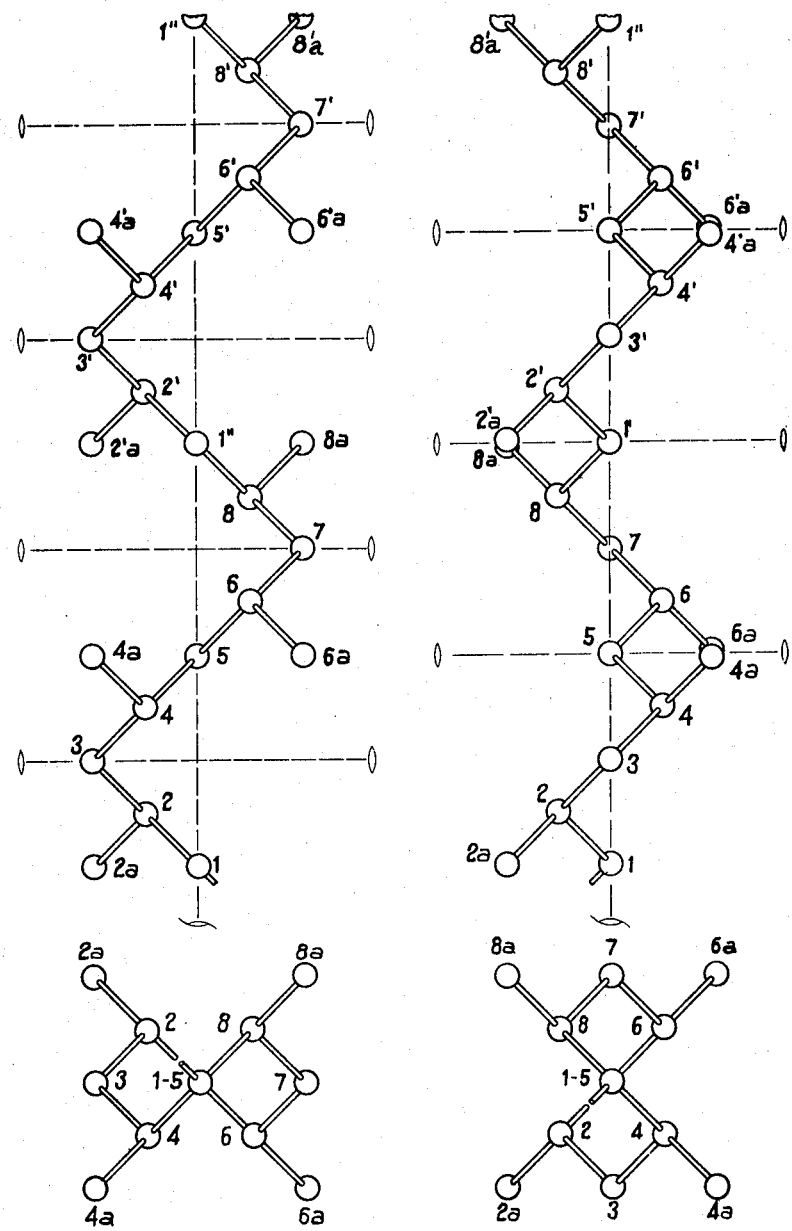

Inventors
GIULIO NATTA
PAOLO CORRADINI
ITALO PASQUON
MARIO PEGORARO
MARIO PERALDO By Toulmin & Toulmin
Attorneys

United States Patent Office 3,258,455
Patented June 28, 1966

3,258,455
POLYPROPYLENE HAVING SYNDIOTACTIC STRUCTURE
Giulio Natta, Paolo Corradini, Italo Pasquon, Mario Pegoraro, and Mario Peraldo, all of Milan, Italy, assignors to Montecatini Società Generale per l'Industria Mineraria e Chimica, a corporation of Italy
Filed June 6, 1960, Ser. No. 33,999
Claims priority, application Italy, June 6, 1959, 9,491/59
10 Claims. (Cl. 260—93.7)

This invention relates to a new high molecular weight polypropylene comprising macromolecules having the syndiotactic type of stereoregular structure.

Previously, Natta et al. disclosed a unique crystallizable polypropylene having a type of stereoregular structure which Natta called the isotactic structure.

The Natta group also disclosed new diolefin polymers comprising macromolecules having 1,2-enchainment of the monomeric units and a type of stereoregular structure which is different from the isotactic structure and which Natta called the "syndiotactic" structure. The syndiotactic structure was shown to be a regular structure in which monomeric units with enantiomorphic configuration of the asymmetrical carbon atoms follow each other alternately and regularly in the macromolecular main chain.

Up to the present time, no polymers of alpha-olefins comprising macromolecules having the syndiotactic type of stereoregular structure have been disclosed.

We have now discovered such a polypropylene.

Before describing the new polypropylene in detail, reference is made to the earlier Natta et al. disclosures relating to the isotactic structure and isotactic macromolecules.

Isotactic structure in a polymeric olefin was shown by Natta et al. to be a stereoregular structure in which the tertiary carbon atoms of a plurality of succeeding monomer units making up a given section of the macromolecular main chain have identical steric configuration.

An isotactic polypropylene macromolecule was shown to be linear, regularly head-to-tail, to have substantially no branches longer than the $CH_3$ group, a ratio of $CH_3$ to $CH_2$ groups of 1:1, an isotactic structure for substantially its entire length, and to be non-extractable with boiling n-heptane.

It was disclosed that, presuming the isotactic macromolecule to be fully extended in a hypothetical plane, the $CH_3$ groups attached to the tertiary carbon atoms of a plurality of successive monomeric units making up a given section of the main chain would lie on one side of the hypothetical plane, e.g., above the plane, and the H atoms attached to those tertiary carbon atoms would lie on the opposite side of the plane, e.g., below the plane. A long portion or section of the chain made up of a plurality of monomeric units and in which section the $CH_3$ groups lie on one side of the plane, e.g., above the plane, could be followed by a long portion or section of the chain made up of a plurality of the monomeric units and in which section the $CH_3$ groups bound to the tertiary carbon atoms lie on the opposite side of the plane, e.g., below the plane.

In an isotactic macromolecule, the given isotactic sections or portions of the macromolecular main chain are long and made up of a plurality of monomeric units the asymmetric tertiary carbon atoms of which have, on said chain section or portion, the same steric configuration.

It was further shown that the isotactic structure renders the polypropylene crystallizable, that the characteristic X-ray diffraction lines of the isotactic polypropylene correspond to lattice distances of 6.3; 5.2; 4.7 A. due to lattice planes parallel to the axis of the chains, and to the lattice distance of 4.1 A. due to lattice planes non-parallel to said axis, and that the diffraction spectrum of stretched specimens of the polypropylene, which reveals the orientation of the crystals, shows diffraction lines which establish a period of identity along the chain of 6.5±0.05 A. and an elixir-like conformation of the principal paraffinic chain.

The infra-red spectra showed characteristic bands for the ternary isotactic elices at 7.67; 7.96; 10.02 and 12.36μ.

It was also disclosed that the characteristics of the polypropylene remain substantially unchanged when the isotactic macromolecules show minor local structure variations along the length of the chain having substantially the isotactic structure.

Referring now to our new polypropylene comprising macromolecules having the syndiotactic structure, it is established that said macromolecules are also linear, regularly head-to-tail, have substantially no branches longer than the $CH_3$ group, and have a ratio of $CH_3$ to $CH_2$ groups of 1:1.

However, the syndiotactic structure in the macromolecules of the present polypropylenes gives an infra-red spectrum and an X-ray diffraction pattern which are distinctly different from the spectra and pattern for the isotactic structure.

Thus, the infra-red spectrum of the present polypropylenes comprising syndiotactic structure shows characteristic bands at 7.62; 7.91; 9.95; 11.53μ and 12.30μ which are dichroic in the stretched and oriented samples, and does not show the characteristic bands for the ternary isotactic elices.

The X-ray diffraction diagrams for the new products show lines corresponding to lattice distances of about 7.25 A. (medium-strong), 5.3 A. (strong) and 4.3 A. (strong) which characterize the product. The line at 6.3 A., which is characteristic of isotactic polypropylene, is absent from the X-ray diffraction spectra for our new products.

[Note: All values of lattice distances must be considered as having an approximation of about 2%, taking into consideration the geometry of the apparatus used for the determinations and the polymeric nature of the product.]

Examination of the X-ray diffraction diagrams of stretched samples of the new polypropylenes show that the reflections (lines) are oriented by the stretching and have a thickness which is comparable to that of lines characteristic of crystalline polymeric products, but not to that usually observed for reflections of non-macromolecular crystalline products. The new polypropylenes are, therefore, crystalline polymers capable of being oriented by stretching.

The new polypropylenes which exhibit crystallinity due to syndiotactic structure generally contain, also, an amorphous portion which presents a high frequency of inversion of the steric configuration along the chain that can be evaluated from the intensity of the infra-red bands at 8.12μ and about 10.38μ. Such bands are present, also, in the I.R. spectra of atactic polypropylenes, to a lower and variable extent, but are not observed in the spectra of molten isotactic polypropylenes.

The X-ray spectra for fibers of the new polypropylenes shows as said the presence of 3 intense equatorial reflections, for lattice distances, of about 7.25 A.; 5.3 A. and 3.6 A., in addition to other less intense reflections.

The presence of the 3 intense reflections has allowed us to make an orientative evaluation of the chain bulk. In fact, we interpret the most intense lines in the X-ray spectra as the reflections of lattice planes (200), (110) and (400) of a centered lattice, $a$ being taken as equal to 14.5 A. and $b$ being taken as equal to 5.7 A.

For a cell of this type, in projection on a plane perpendicular to the chain axis, the surface occupied by a chain is about 41 A.². A density of 0.94 for the new crystalline polypropylene corresponds to a period of about 1.8 A. for each monomeric unit.

The foregoing values and characteristics indicate an elixir-like chain presenting a syndiotactic succession, in which the Van der Waals contacts between methyl groups within the chain are more satisfactory than those which would occur in a corresponding planar syndiotactic chain. The pattern of such an elixir-like chain is shown in the accompanying drawing. The pattern satisfies the principle of "staggered bonds" and corresponds to a period of 7.1 A. for 4 monomeric units (about 1.78 A. for each monomeric unit), the C–C–C angles having the usual tetrahedron value. In the pattern shown, all monomeric units are equivalent.

The figure shows the projections of the pattern of the chain onto 3 orthogonal planes, atoms 6a and 4a in the projection on the upper right hand side being displaced slightly so as to make visible the two methyl groups which otherwise would not have been visible in the drawing.

The identity period of about 7.4 A. along the chain axis which we have determined from the spectra of oriented fibers obtained by subjecting extruded filaments of the new polypropylene to cold-stretching corresponds closely to the identity period of the pattern shown in the drawing.

The spectra of fibers we have obtained from certain of our new polypropylenes (e.g., of fractions 15 and 25 reported in Example 2 below) are particulraly good and contain several reflections (about 40) on various layers, all of which are attributable to syndiotactic structure. The positions of the reflections observed in the X-ray diffraction diagram agree with the pattern shown in the drawing and the intensities of the observed reflections also agree with the intensities that can be calculated on the basis of the pattern.

The pattern shown further conforms to the existence of the centered lattice, with all intramolecular contacts between methyl groups being higher than 4.0 A.

Our new polypropylenes comprising macromolecules having the syndiotactic structure have properties which are considerably different from the properties of the earlier Natta et al. polypropylenes which show the same percent of crystallinity due to the different sterically regular isotactic structure.

The new polypropylenes can be processed by the methods generally used for processing thermoplastic polymers, including die-casting, injection-molding and extrusion.

We have produced polypropylenes comprising stereoblock macromolecules having syndiotactic sections and low crystallinity which, particularly in the form of filaments and films, are oriented by stretching to yield oriented articles characterized by a high reversible elasticity and a relatively high tensile strength.

The stress-elongation diagram shows a relatively high modulus of elasticity and high elastic elongations.

Polypropylenes according to the present invention and which exhibit a crystallinity of syndiotactic type (as opposed to crystallinity of the different isotactic type) are of interest as thermoplastic materials. Some of the new polypropylenes are, as noted above, of particular interest for applications requiring a high elasticity.

Polypropylenes of this invention can be vulcanized by methods similar to those which have been disclosed for vulcanizing atactic (amorphous) polypropylene, i.e., polypropylene substantially made up of atactic amorphous macromolecules in which monomeric units having enantimorphous steric configuration occur in a disordered way along the main chain, and amorphous vulcanizable copolymers of propylene and ethylene.

However, vulcanizates of polypropylenes according to this invention have better mechanical properties than vulcanized atactic polypropylenes, the improvement being particularly noticeable in the case of moderately vulcanized products.

As compared to unsaturated rubber, vulcanized polypropylenes comprising stereoblock macromolecules having syndiotactic sections have the advantage of greater resistance to ageing.

The rebound elasticity of elastomers obtained from polypropylenes according to this invention is better than the rebound elasticity of elastomers obtained from polyisobutene. In fact, the energy absorbed by hysteresis by our new elastomers when they are subjected to alternating stresses is lower than for the known elastomers based on polyisobutene.

We have found that polypropylene comprising macromolecules having syndiotactic structure can be obtained by polymerizing propylene in contact with certain catalysts of the anionic coordinate type, under particular conditions.

Not all anionic coordination catalysts that have been suggested for the polymerization of alpha-olefins yield polypropylenes comprising or consisting of macromolecules having the syndiotactic structure. For instance, the polypropylene produced by polymerizing propylene in contact with the catalytic systems obtained by mixing alpha-titanium trichloride with trialkyl aluminum, such as triethyl aluminum, does not show, on X-ray and infrared examination, the presence of syndiotactic structure therein.

One catalytic system which we found can be used under certain conditions is prepared from alpha-titanium trichloride and diethyl aluminum monochloride. Other specific catalytic systems which we have found to be useful for our present purposes are prepared from alpha- or gamma-TiCl₃ and diethyl aluminum monofluoride, from alpha- or gamma-TiCl₃ and diethyl aluminum iodide; from titanium tri-iodide and diethyl aluminum iodide; from alpha- or gamma TiCl₃ and diethyl aluminum monocyclopentadienyl; and by mixing a soluble Ti compound such as titanium tetrachloride with chromium trichloride and diethyl aluminum monofluoride.

He have discovered that the polymerization of propylene in contact with the catalysts mentioned, at a temperature below 30° C. and in a solvent chemically inert to the catalyst, results in the production of polypropylene comprising macromolecules having the syndiotactic structure.

Natta et al. have disclosed that the crude polypropylene (obtained by polymerizing propylene with anionic coordination catalysts) consists, in general, of a mixture of atactic amorphous macromolecules, stereoblock macromolecules containing both isotactic and atactic sections in the main chain, and isotactic macromolecules, and that the sterically differentiated macromolecules can be separated by solvent fractionation.

Thus, Natta et al. disclosed that the atactic amorphous macromolecules are soluble in boiling ether and can be selectively separated from the crude polypropylene by extracting it with that solvent. They also showed that stereoblock macromolecules exhibiting a crystallinity due to isotactic structure can be separated from the crude polypropylene by extraction with boiling n-heptane, and that the heptane extraction leaves a residue, non-extractable with the boiling heptane and made up of isotactic macromolecules.

A difference between isotactic macromolecules and stereoblock macromolecules the main chain of which contains both isotactic and atactic sections is that the isotactic macromolecules are highly crystallizable and exhibit a high percentage of crystallinity at the X-rays, having an isotactic structure for substantially the entire length of the main chain, the chain shows no local structure variations of sufficient magnitude to substantially alter the properties or the non-extractability of the macromolecules with boiling n-heptane which is characteristic of isotactic polypropylene, whereas in stereoblock macromolecules comprising isotactic and atactic sections the atactic sections in the main chain are generally of sufficient magnitude to substantially reduce the crystallinity exhibited by the macromolecules (as compared to isotactic macromolecules) and to render the stereoblock macromolecules extractable with boiling n-heptane.

Natta et al. also showed that when propylene is polymerized in contact with stereospecific catalysts such as their catalyst prepared from alpha-titanium trichloride (violet crystalline $TiCl_3$) and triethyl aluminum, the polymerization is oriented or "steered" to the direct production of a crude polypropylene having a very high content of, or consisting essentially of, isotactic macromolecules. Those crude polypropylenes may and generally do contain relatively small proportions of atactic macromolecules and stereoblock macromolecules as discussed above. However as noted above, we have established that the polypropylenes obtained by polymerizing propylene in contact with the catalysts prepared from titanium halides and aluminum trialkyls do not comprise macromolecules having syndiotactic structure, as determined by X-ray and infrared examinations.

By polymerizing propylene, at temperatures below 30° C., in contact with a catalytic system prepared by mixing alpha-$TiCl_3$ with $(C_2H_5)_2$ AlCl, and extracting the resulting crude polypropylene with ethyl ether, to remove atactic polypropylene, and then extracting the ether-insoluble residue successively with isopropyl ether, pentane, hexane and heptane, we obtained by the last-mentioned successive extractions polypropylenes comprising macromolecules having syndiotactic structure as shown by the infra-red and X-ray examinations thereof. The I.R. spectra for the fractions extracted with isopropyl ether, pentane, hexane, and heptane all showed the absorption band at 11.53$\mu$ and the X-ray diffraction patterns all showed the line corresponding to a lattice distance of about 7.25±0.15 A. which characteristics cannot be attributed to isotactic structure.

These fractions also comprised stereoblock macromolecules comprising isotactic sections. The absorption bands which are characteristic of syndiotactic polypropylene were present with different intensity ratios, in relation to the intensity of bands due to stereoblocks of isotactic nature, in the I.R. spectra of the successive fractions.

The absorption band at 11.53$\mu$ and the line corresponding to the lattice distance of about 7.25±0.15 A. were not present in the I.R. spectra and X-ray diffraction diagram of the residue of the heptane extraction (isotactic polypropylene) or of a fraction we obtained by extracting that residue with octane.

The absorption band in the I.R. spectra and the lines in the X-ray diffraction diagrams, which indicated a crystallinity due to a stereoregular structure different from the isotactic structure and which we discovered to be due to syndiotactic structure, have been proved to exist only in the I.R. spectra and X-ray diffraction diagrams of polypropylenes prepared with the aid of specific catalytic systems, are more intense in polypropylenes produced at temperatures below 30° C., disappear when the polypropylene is heated to a temperature above 150° C., and appear again when the polypropylene is cooled, finally attaining their original intensity.

That we obtained polypropylenes which exhibit crystallinity due to a steric structure different from the isotactic structure (syndiotactic structure) is demonstrated by the foregoing facts, taken with the further fact that when our polypropylenes are oriented by stretching, an orientation of the bands in the I.R. spectra is observed.

The new crystalline phase (different crystalline polypropylene) is not a different allotropic modification of isotactic polypropylene. This is shown by the fact that thermal treatments do not lead to transformation of the new crystalline phase into the phase known for isotactic polypropylene.

With the aid of the solvent fractionation method it was in general difficult to isolate the new crystalline phase from those fractions which also comprised macromolecules containing isotactic stereoblocks and which exhibited both crystallinity of isotactic type and crystallinity of the new type.

However, we succeeded in accomplishing such isolation by a new chromatographic method based on the principle, discovered by us, that isotactic portions which are present in the chains of stereoblock macromolecules comprising isotactic and atactic portions or sections, are preferentially adsorbed on adsorbing masses consisting of highly crystalline isotactic polypropylene.

This preferential absorption takes place due to the tendency, discovered by us, of the isotactic portions present in the solution to crystallize epitactically on the surface of the crystals of isotactic polypropylene.

Our chromatographic method also allows us to obtain fractions enriched in the new crystalline phase, and which exhibit crystallinity of syndiotactic type only and the infrared spectra of which do not show the characteristic bands for the ternary isotactic elices, but do show the bands at 7.67; 7.91; 9.95; 11.53 and 12.30$\mu$ which are characteristic for syndiotactic polypropylene, starting from certain extracts obtained by solvent fractionation of crude polymers showing only crystallinity due to the new phase, prepared with the aid of certain particular catalysts of the anionic coordinate type, under particular conditions.

These particular catalysts are prepared from halogen-free vanadium compounds, in particular vanadium acetylacetonates, and from compounds of the general formula $AlR_1R_2X$, were X indicates a halogen atom, such as fluorine, chlorine, bromine and $R_1$ and $R_2$ indicate alkyl-; aryl, alkylaryl- or cycloalkyl groups containing up to 10 carbon atoms.

If propylene is polymerized with the aid of catalysts of this particular type at low temperatures, below 0° C., and preferably between —30° C. and —100° C., the crude polymer obtained only shows crystallinity due to syndiotactic structure.

It is of advantage, in order to obtain a crude containing lower amounts of amorphous polymer, to carry out the polymerization in the absence of solvents for the vanadium compound or for the products of its reaction with the metallorganic aluminum compound.

In order to eliminate amorphous polymer which may be present in the crude polymer thus obtained, extraction with solvents capable of dissolving only the amorphous polymer, such as e.g. ethyl ether, isopropyl ether or aliphatic hydrocarbons, such as n-heptane, can be used, operating at temperatures below 50° C. Fractions containing polymers showing a higher crystallinity of the syndiotactic type can be obtained by extracting the crude, or the residue remaining after extraction of the amorphous fraction, with solvents such as n-hexane and n-heptane at temperatures below 70° C. Similar results can be reached with the aid of the described chromatographic method: in this case an adsorbent different from crystalline isotactic polypropylene can be used.

The following examples describe methods by which we obtained polypropylenes comprising macromolecules having syndiotactic structure and which exhibited crystallinity of the syndiotactic type.

*Example 1*

230 cc. anhydrous n-heptane, 4 g. alpha-titanium trichloride and 10 cc. diethyl aluminum monochloride in 20 cc. anhydrous n-heptane were introduced under nitrogen into a 500 cc. oscillating autoclave, kept at a constant temperature of 14° C. by water circulation. The autoclave was closed, nitrogen was removed by means of a vacuum pump, agitation was started and propylene was introduced up to a pressure of 4 atmospheres above room pressure.

After 60 hours the polymer was discharged and completely precipitated with methanol.

The precipitated polymer was washed first with a hydrochloric acid solution in methanol and then with methanol alone and was finally dried.

The polymer thus obtained was subjected to a series of extractions with ethyl ether, isopropyl ether and n-heptane at their boiling points. The following fractions were thus extracted:

|  | Percent of the total |
|---|---|
| Ethyl ether extract | 10.5 |
| Isopropyl ether extract | 0.5 |
| Heptane extract | 2.2 |
| Residue | 86.8 |

The various fractions were examined at the X-rays.

The fractions separated with isopropyl ether and n-heptane (and only these) gave a spectrum which showed the reflections for lattice distances of about 7.2, 5.3 and 4.3 A.

These reflections tend to disappear, in the case of the heptane extract, by heating to 110–150° C. The fraction obtained by extraction with isopropyl ether, which contained also some polymer showing crystallinity of isotactic origin (about 10% of the total) was subjected to a further fractionation by chromatography as follows:

A Pyrex glass column having a height of 50 cm. and an internal diameter of 1.8 cm., kept at constant temperature by a circulating fluid, was partially filled (up to 40% of its height) with highly crystalline isotactic polypropylene, not extractable with boiling heptane ($\mu$)=1.22×100 cc./g. in tetrahydronaphthalene at 135° C.

On this layer of chromatographic adsorbent was placed a layer (which occupies 10% of the column height) consisting of the polypropylene to be fractionated and which had been dissolved in boiling isopropyl ether, adsorbed on a small amount of highly crystalline isotactic polypropylene and finally dried. The elution with isopropyl ether was started at 21° C. and then continued at increasing temperatures (30°, 40°, 50° and 60° C.), obtaining at least two fractions for each temperature.

The last fractions were eluted with n-heptane at 80° C. In all, 14 fractions were obtained.

The infra-red examination was carried out on the crude polymer and on the larger fractions. The first fraction at 21° C. was found to consist of atactic polymer and of impurities. The second fraction obtained at 21° C. was found to be enriched in the new crystalline phase.

For each temperature higher than 21° C. it was ascertained that the first fraction was richer in crystalline syndiotactic polymer than the next one.

In particular the first fraction obtained at 40° C. (fraction 5) did not present crystallinity due to isotactic structure but only crystallinity due to syndiotactic structure.

From the intensity ratio of the band at 11.53$\mu$ in the I.R. spectrum, in comparison with the polymer subjected to chromatographic fractionation, there was an enrichment in crystallinity due to syndiotactic structure of 60%.

*Example 2*

230 cc. anhydrous toluene, 4 g. alpha-titanium trichloride and 2 cc. diethyl aluminum fluoride in 20 cc. anhydrous toluene were introduced under nitrogen into a 500 cc. oscillating autoclave, kept at 14° C. by water circulation.

The autoclave was closed, nitrogen was removed by means of a vacuum pump, agitation was started and propylene was introduced up to a pressure of 5 atomspheres above atmospheric pressure.

After 14 hours, the polymer was discharged and completely precipitated with methanol. The precipitated polymer was then washed first with a hydrochloric acid solution in methanol and then with methanol alone, and finally dried. The polymer thus obtained was subjected to a series of successive extractions with ethyl ether, n-pentane, n-hexane and n-heptane, all of them anhydrous, at their boiling points. The following extracts were obtained:

|  | Percent |
|---|---|
| Ether extract | 8.7 |
| Pentane extract | 1.0 |
| Hexane extract | 1.4 |
| Heptane extract | 2.9 |
| Residue | 86.0 |

These fractions were examined at the X-rays. The fractions separated with pentane, hexane and heptane gave a spectrum which, in addition to the reflection due to polypropylene with isotactic structure, showed also the reflections for lattice distances of about 7.2; 5.3 and 4.3 A., which cannot be ascribed to said isotactic structure. The ether extract and the residue did not show the reflections for lattice distances of 7.2; 5.3 and 4.3 A.

The hexane extract was subjected to chromatographic fractionation according to the procedure described in Example 1.

It was successively eluted with isopropyl ether at 20°, 30°, 40°, 50°, 60° C., with n-hexane at 60° C. and with n-heptane at 60°, 70°, 80° and 90° C.

38 fractions were obtained which were examined at the infra-red. It was found that the fractions eluted with isopropyl ether at temperatures lower than 40° C. (such as e.g. fractions 1 to 5) consisted mainly of amorphous polypropylene.

At 60° C. or at higher temperatures the use of isopropyl ether, n-hexane and n-heptane made it possible to separate fractions rich in the syndiotactic structure. For each solvent at each different temperature the portion of the polymer was extracted which can be eluted under the given conditions. The polymer first eluted was the one presenting crystallinity due to syndiotactic structure and after that the polymer having isotactic structure was eluted. More particularly, this behaviour was observed in examining fractions 6 and 7 obtained by eluting with isopropyl ether at 40° C.; fractions 8, 9, 10 obtained with isopropyl ether at 50° C.; fractions 12 and 13 obtained with isopropyl ether at 60° C.; fractions 14, 15 and 16 and 17 obtained with n-hexane at 60° C.; and fractions 25 and 26 obtained with n-heptane at 70° C.

Fractions practically free of isotactic structure and rich in syndiotactic structure, such as fractions 6 and 8, separated with isopropyl ether at 40° and 50° respectively, and fractions rich in isotactic structure and free of syndiotatic structure, such as fractions 10, 13 and 24, obtained with isopropyl ether at 50° C. and 60° C. and with n-heptane at 70° C., respectively were thus obtained.

The incomplete separation sometimes observed in the intermediate fractions can be caused in part by the insufficient number of fractions of eluted solution. More particularly the first and second fractions eluted at 60° C. with n-hexane presented an enrichment of crystallinity due to syndiotactic structure (in respect of the starting fraction) which is the same for both fractions and amounts to about 50%; moreover the second heptane fraction at 70° C. (obtained after the extractions with isopropyl ether and n-hexane) presented an enrichment in crystallinity due to syndiotactic structure of 120%, in respect of the starting fraction.

*Example 3*

250 cc. anhydrous toluene, 1 g. gamma-titanium trichloride, and 1 cc. diethyl aluminum fluoride were introduced under nitrogen into a 500 cc. oscillating autoclave kept at the constant temperature of 14° C. by water circulation. The autoclave was closed, nitrogen was removed by means of a vacuum pump and agitation was started while introducing propylene up to a pressure of 6 atmospheres. After 48 hours, the polymer was discharged and precipitated with methanol. The precipitated polymer was washed first with a HCl solution in methanol and then with methanol alone and was finally dried.

9 g. polymer were thus obtained and subjected to successive extractions with ethyl ether, n-pentane, n-hexane and n-heptane at their boiling points. The following fractions were obtained:

| | Percent of the total |
|---|---|
| Ether extract | 10 |
| n-Pentane extract | 1.0 |
| n-Hexane | 1.1 |
| n-Heptane extract | 1.0 |
| Residue | 86.9 |

The various fractions thus separated were subjected to X-ray examination.

Only the fractions separated with n-pentane and n-hexane gave a spectrum which showed reflections at lattice distances of about 7.2; 5.3 and 4.3 A., which cannot be ascribed to the known polypropylene of isotactic structure.

The spectrum of the fraction extracted with n-pentane does not present the characteristic reflections of the isotactic structure of polypropylene.

*Example 4*

350 cc. anhydrous toluene, 1.5 g. titanium tri-iodide, and 2 cc. diethyl aluminum iodide were introduced under nitrogen into a 500 cc. oscillating autoclave kept at the constant temperature of 14° C. by water circulation.

The autoclave was closed, nitrogen was removed by means of a vacuum pump, agitation was started and propylene was introduced up to a pressure of 5 atmospheres. After 50 hours the polymer was discharged and precipitated with methanol.

The precipitated polymer was then washed first with HCl solution in methanol and then with methanol alone, and was finally dried. 13 g. polymer are obtained.

The polymer thus obtained was subjected to successive extractions with ethyl ether, n-pentane, n-hexane and n-heptane at their boiling temperatures. The following fractions are isolated:

| | Percent of the total |
|---|---|
| Ethyl ether extract | 35.6 |
| n-Pentane extract | 1.0 |
| n-Hexane extract | 4.3 |
| n-Heptane extract | 8.9 |
| Residue | 50.2 |

The various fractions were subjected to X-ray examination. Only the fractions separated with n-pentane and n-hexane gave a spectrum which presents reflections at lattice distances of about 7.2; 5.3 and 4.3 A. which cannot be ascribed to isotactic structure.

*Exampde 5*

250 cc. anhydrous toluene, 1 g. alpha-titanium trichloride, and 1 cc. diethyl aluminum iodide were introduced under nitrogen into a 500 cc. oscillating autoclave kept at the constant temperature of 81° C. by oil circulation. The autoclave was closed, nitrogen was removed by means of a vacuum pump, agitation was started and propylene was introduced up to a pressure of 2 atmospheres.

After 22 hours the polymer was discharged and precipitated with methanol.

The precipitated polymer was washed first with a solution of HCl in methanol and then with methanol alone and was finally dried. 11.4 g. polymer were obtained and extracted successively with n-pentane and n-heptane at their boiling points. The following fractions were obtained:

| | Percent of the total |
|---|---|
| Pentane extract | 2.0 |
| n-Heptane extract | 4.3 |
| Residue | 93.7 |

The fractions were subjected to X-ray examination. They were all crystalline including the heptane extract having a very low molecular weight.

The spectrum of said heptane extract presents reflections for lattice distances at about 7.2; 5.3 and 4.3 A., which cannot be ascribed to the isotatic structure in the polypropylene.

*Example 6*

250 cc. anhydrous toluene, 1 g. gamma-titanium trichloride, and 3 cc. diethyl aluminum monocyclopentadienyl were introduced under nitrogen into a 500 cc. oscillating autoclave kept at the constant temperature of 14° C. by water circulation.

The autoclave was closed, nitrogen was removed by means of a vacuum pump, agitation was started and propylene was introduced up to a pressure of 5 atmospheres.

After 20 hours the polymer was discharged and precipitated with methanol.

The precipitated polymer was washed first with a HCl solution in methanol and then with methanol alone and finally dried.

6 g. polymer were obtained and subjected to successive extractions with ethyl ether and n-heptane at their boiling temperatures. The following fractions were isolated:

| | Percent of the total |
|---|---|
| Ethyl ether extract | 1.6 |
| n-Heptane extract | 1.6 |
| Residue | 96.8 |

The fractions extracted with n-heptane gave an X-ray spectrum which showed the reflections at lattice distances of about 7.2; 5.3 and 4.3 A., which we have established to be characteristic of syndiotactic structure.

*Example 7*

150 cc. of anhydrous toluene, 1.8 g. $CrCl_3$, 2.5 cc. $Al(C_2H_5)_2F$ and 0.5 g. $TiI_4$ were introduced under nitrogen into a 500 cc. oscillating autoclave kept at the constant temperature of 14° C. by water circulation. The autoclave was closed, nitrogen was removed by means of a vacuum pump, agitation was started and propylene was introduced up to a pressure of 5 atmospheres.

After 250 hours the polymer was discharged and was washed first with a solution of HCl in methanol and then with methanol alone and finally dried.

53 g. polymer were obtained and subjected to successive extractions with ethyl ether, n-pentane, n-hexane and n-heptane at their bioling points. The following fractions were obtained:

| | Percent of the total |
|---|---|
| Ethyl ether extract | 60 |
| n-Pentane extract | 7 |
| n-Hexane extract | 8 |
| n-Heptane extract | 7 |
| Residue | 18 |

The various fractions thus isolated were subjected to X-ray examination. Only the fractions separated with n-pentane and n-hexane give a spectrum presenting reflections at lattice distances of about 7.2; 5.3 and 4.3 A., which cannot be ascribed to the isotactic structure of polypropylene.

The spectrum of the fraction extracted with n-pentane does not present reflections deriving from the isotactic structure.

*Example 8*

100 cc. anhydrous toluene, 1.8 g. $CrCl_3$, 0.5 cc. $Ti(O-iC_3H_7)_4$ and 2.5 cc. $Al(C_2H_5)_2F$ were introduced under nitrogen into a 500 cc. oscillating autoclave kept at the constant temperature of 14° C. by water circulation.

The autoclave was closed, nitrogen was removed by means of a vacuum pump, agitation was started and propylene was introduced up to a pressure of 5 atmospheres.

After 70 hours the polymer was discharged and precipitated with methanol.

The precipitated polymer was washed first with a solution of HCl in methanol and then with methanol alone and finally dried. 31 g. polymer were obtained and extracted successively with ethyl ether, n-pentane, n-hexane and n-heptane at their boiling temperatures. The following fractions were obtained:

| | Percent of the total |
|---|---|
| Ethyl ether extract | 37 |
| n-Pentane extract | 3.5 |
| n-Hexane extract | 5.0 |
| n-Heptane extract | 12.6 |
| Residue | 41.9 |

The various fractions were subjected to X-ray examination. The fraction separated with n-heptane gives a spectrum presenting reflections at lattice distances of about 7.2; 5.3 and 4.3 A., which cannot be ascribed to the previously known isotactic structure of polypropylene. The reflections corresponding to the isotactic polymer are absent.

The spectrum of the hexane extract, in addition to the aforementioned reflections, presents also the reflections characteristic of isotactic polypropylene.

The spectra of the heptane extract and of the residue present only reflections due to the structure of isotactic polypropylene.

*Example 9*

0.5 g. vanadium triacetylacetonate and 30 cc. anhydrous n-heptane were introduced under nitrogen in a glass tube of 100 cc. capacity. The tube was cooled to $-78°$ C., 2 cc. aluminum diethylmonochloride and, after a few minutes, 15 g. propylene were added.

After 24 hours, during which the tube was kept at $-78°$ C., 5 g. of a solid polypropylene showing at the X-rays only reflections corresponding to lattice distances of 7.25 A., 5.3 A., and 4.3 A., were obtained.

*Example 10*

3 g. vanadium triacetylacetonate and 30 g. aluminum diethyl monofluoride dissolved in 30 cc. anhydrous normal heptane were introduced into a stainless steel autoclave of 500 cc. capacity. After cooling to $-78°$ C., 200 g. propylene were added.

Polymerization was carried out under stirring for 72 hours, at $-78°$ C. At the end of this time a solid polypropylene showing at the X-rays only reflections due to lattice distances of 7.25; 5.3 and 4.3 A. was obtained.

The isotactic structure has been described in terms of the disposition of the $CH_3$ groups and H atoms attached to the tertiary asymmetric main chain carbon atoms of a plurality of successive monomeric units with respect to a hypothetical plane in which the macromolecule is presumed to be fully extended. Describing the syndiotactic structure in the same terms, it can be stated that, presuming the macromolecule to be fully extended in the hypothetical plane, the $CH_3$ groups and H atoms of a plurality of successive monomeric units will lie in a regularly alternating order on the opposite sides of the plane, the $CH_3$ group in one monomeric unit lying on one side of the plane, e.g., above the plane, and the $CH_3$ group in the next succeeding unit lying on the opposite side of the plane, e.g., below the plane.

The polypropylenes have high molecular weights above 1000 and generally above 20,000.

All of our new polypropylenes comprise or consist of macromelocules having the syndiotactic structure and may exhibit crystallinity due prevailingly or exclusively to syndiotactic structure. Our new products include polypropylenes comprising stereoblock macromolecules which exhibit both crystallinity due to isotactic structure and crystallinity due to syndiotactic structure.

As we have noted hereinabove, the catalytic systems exhibit a high degree of unpredictable specificity for the production of polypropylene comprising macromolecules having syndiotactic structure.

The results obtained wtih the catalyst prepared from alpha-$TiCl_3$ and trialkyl Al, specifically triethyl Al, can be contrasted with the results obtained with the catalyst prepared from alpha-$TiCl_3$ and $(C_2H_5)_2$ AlCl.

Both of those catalysts have been shown by Natta et al. to be highly stereospecific in the polymerization of propylene to isotactic polypropylene.

However, using our conditions as disclosed herein, we have succeeded in obtaining the new polypropylene comprising macromolecules having the syndiotactic structure, using the catalysts prepared from alpha-$TiCl_3$ and $(C_2H_5)_2AlCl$. On the other hand, such polypropylenes were not obtained, even under our conditions, when the catalyst used for the propylene polymerization was prepared from alpha-$TiCl_3$ and triethyl Al.

Using a catalyst prepared from $LiC_4H_9$ and $TiCl_4$, and our conditions, we obtained a polypropylene from which, by extracting the atactic polymer with ethyl ether, and then extracting the ether-insoluble residue with heptane, or successively with pentane, hexane and heptane, and subjecting the last-mentioned extracts to our chromatographic fractionation process, we obtained polypropylenes the X-ray diffraction diagrams of which showed the reflexes for lattice distances of about 7.2; 5.3 and 4.3 A. Those reflexes are not present in the X-ray diffraction diagrams of the ether extracts or of the residue of the heptane extraction.

The examples given demonstrate that we have obtained, and identified and characterized by infra-red and X-rays data, new polypropylenes having syndiotactic structure and which exhibit crystallinity due to that structure and different from the crystallinity which is due to isotactic structure in a polypropylene. In the method described, the starting crude polypropylene comprised, also, both atactic macromolecules, stereoblock macromolecules having some isotactic portions, and isotactic macromolecules. The atactic macromolecules and the isotactic macromolecules were separated by subjecting the crude to solvent fractionation and the remaining fraction or fractions were then treated to separate the macromolecules presenting crystallizable syndiotactic structure from macromolecules containing some crystallizable isotactic portions or sections chromatographically. The chromatographic fractionation technique described in the examples can be varied by adsorbing a solution of polypropylene comprising macromolecules having the syndiotactic structure (as determined by X-rays and infra-red data) on an isotactic polypropylene column as described, and then eluting with a solvent not having polypropylene dissolved therein.

We found that, in addition to the specificity shown by the catalytic system selected, the temperature at which the propylene is polymerizezd with the particular catalytic systems is also critical to the production of polypropylene comprising macromolecules having the syndiotactic structure, and is below 30° C. Moreover, the proportion of such macromolecules produced generally increases with decrease in the polymerization temperature. For example, using the catalytic system

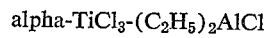

alpha-$TiCl_3$-$(C_2H_5)_2AlCl$ at a polymerization temperature of 70° C., we did not obtain polypropylenes which showed, on examination at the X-rays, the same diffraction pattern as the polypropylenes we obtained by polymerizing propylene with that catalytic system at temperatures below 30° C.

The polymerization temperature can be from $+30°$ C. $-100°$ C.

The difference between isotactic structure and syndiotactic structure in a polypropylene is shown in the two figures given below. FIGURE A is a model of a portion of the main chain of a polypropylene having isotactic structure, in which chain portion the $CH_3$ groups attached to the tertiary carbon atoms of successive monomeric units all lie on one side (as shown, above) of the hypothetical plane in which the macromolecule is presumed to be fully extended. FIGURE B is a model of a chain portion of a polypropylene according to the present invention and having syndiotactic structure, in which, as shown, the $CH_3$ groups attached to the tertiary asymmetric carbon atoms of the successive monomeric units alternate regularly on the opposite sides of the plane.

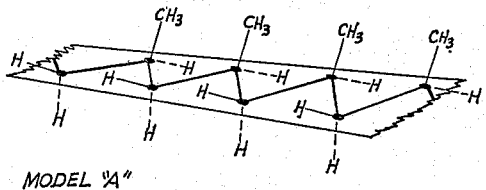

MODEL "A"

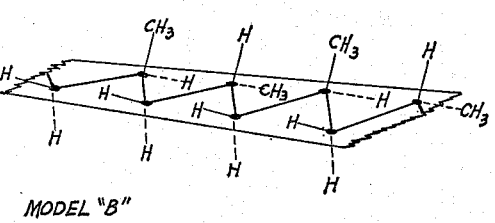

MODEL "B"

In the accompanying drawing, FIGURES 1 and 2 are side views of sections of the enantiomorphous chain of a polypropylene macromolecule having syndiotactic structure; and FIGURES 3 and 4 are, respectively, end views of the chain sections shown in FIGURES 1 and 2.

In the drawing, the reference characters $2a$, $4a$, $6a$, $8a$, $2'a$, $4'a$, $6'a$, and $8'a$ designate $CH_3$ groups, the reference characters 1, 3, 5, 7, 1', 3', 5', 7' and 1'' designate $CH_2$ groups; and the reference characters 2, 4, 6, 8, 2', 4', 6', and 8' designate CH groups.

What is claimed is:

1. A process for polymerizing propylene to crude polypropylene showing crystallinity exclusively of syndiotactic type at the X-rays and characterized by an infrared spectrum showing bands at 7.62; 7.91; 9.95; 11.53 and 12.3 microns, which bands are dichroic in the oriented polypropylene, an X-ray fiber diffraction diagram showing reflections corresponding to lattice distances of about 7.2; 5.3 and 3.6 A. (equatorial reflections) and 4.3 A. (first layer), and by an identity period along the chain axis of about 7.4 A., said process comprising polymerizing propylene in contact with a vanadium acetyl-acetonate —$AlXR_1R_2$ catalyst system, in which X represents a halogen atom and $R_1$ and $R_2$ are selected from the group consisting of alkyl-, aryl-, arylalkyl- and cycloalkyl-hydrocarbon radicals containing up to 10 carbon atoms, at a temperature between —30° and —100° C.

2. A process according to claim 1, characterized in that the crude polypropylene is obtained by polymerizing propylene in contact with a vanadium actyl-acetonate-aluminum diethylmonofluoride catalytic system.

3. A process according to claim 1, characterized in that the crude polypropylene is obtained by polymerizing propylene in contact with a vanadium acetyl-acetonate-aluminum diethylmonochloride catalyst system.

4. A process according to claim 1, characterized in that the crude polypropylene is obtained by polymerizing propylene in the absence of solvents capable of dissolving, at the reaction temperature, the vanadium acetylacetonate or its reaction products with the metallorganic aluminum compound.

5. A polypropylene showing crystallinity exclusively of syndiotactic type at the X-rays and characterized by an infra-red spectrum showing bands at 7.62; 7.91; 9.95; 11.53 and 12.30μ, which bands are dichroic in the oriented polypropylene, an X-ray fiber diffraction diagram showing reflections corresponding to lattice distances of about 7.2; 5.3 and 3.6 A. (equatorial reflections) and 4.3 A. (first layer), and by an identity period along the chain axis of about 7.4 A.

6. A high molecular weight polypropylene showing crystallinity at the X-rays which is due exclusively to the fact that a portion of the macromolecules contained therein present a stereoregular structure which is exclusively syndiotactic and characterized by an infra-red spectrum, an X-ray fiber diffraction diagram, and an identity period as recited in claim 5.

7. A high molecular weight polypropylene showing crystallinity at the X-rays which is due exclusively to the fact that the polypropylene consists of macromolecules containing chain portions which show a stereoregular structure which is exclusively syndiotactic and characterized by an X-ray diffraction diagram, and an identity period as recited in claim 5.

8. A high molecular weight polypropylene showing crystallinity at the X-rays due exclusively to the presence therein of macromolecules which contain chain portions having syndiotactic structure and which have an infra-red spectrum, an X-ray fiber diffraction diagram, and an identity period as recited in claim 5.

9. Shaped manufactured articles of a polypropylene comprising macromolecules that have syndiotactic structure, exhibit crystallinity exclusively of syndiotactic type at the X-rays, have an infra-red spectrum showing bands at 7.62; 7.91; 9.95; 11.53 and 12.30μ, which bands are dichroic in the oriented polypropylene, an X-ray fiber diffraction diagram showing reflections corresponding to lattice distances of about 7.2; 5.3 and 3.6 A. (equatorial reflections) and 4.3 A. (first layer), and an identity period along the chain axis of about 7.4 A.

10. Polypropylene showing crystallinity exclusively of syndiotactic type at the X-rays and comprising stereoblock macromolecules having (A) crystallizable chain sections having syndiotactic structure and (B) non-crystallizable atactic chain sections, the chain sections (A) and (B) being inseparable by solvent fractionation.

References Cited by the Examiner

UNITED STATES PATENTS

| 2,909,511 | 10/1959 | Thomas | 260—93.7 |
| 2,956,991 | 10/1960 | Coover et al. | 260—93.7 |

FOREIGN PATENTS 549,638  1/1957  Belgium.

OTHER REFERENCES

Huggins, J. Am. Chem. Soc., vol. 66, pp. 1991–1992, 1944.

Natta et al.: Ricerca Scientifica, vol. 28, pp. 1473–1478 et seq., 1958, reproduced in Stereospecific Catalysis and Stereoregular Addition Polymers. A collection of the original papers by Prof. Giulio Natta and co-workers. Vol. III, paper No. 88.

Natta, Scientific American, vol. 197, No. 3, September 1957, pp. 98–104, only pp. 98–99 needed.

JOSEPH L. SCHOFER, *Primary Examiner.*

MORRIS LIEBMAN, LEWIS GOTTS, *Examiners.*

F. L. DENSON, *Assistant Examiner.*